United States Patent
Rehil

(10) Patent No.: US 6,398,835 B1
(45) Date of Patent: Jun. 4, 2002

(54) AIR FILTERING DEVICE HAVING A TOROIDALY SHAPED SHROUD ATTACHED TO A FAN GUARD FOR HOLDING A TOROIDALLY SHAPED FILTER ELEMENT

(76) Inventor: Om Prakash Rehil, 910 Overlook Rd., Marion, IN (US) 46952

( * ) Notice: Subject to any disclaimer, the term of this patent is extended or adjusted under 35 U.S.C. 154(b) by 8 days.

(21) Appl. No.: 09/653,347

(22) Filed: Aug. 31, 2000

Related U.S. Application Data

(60) Provisional application No. 60/155,706, filed on Sep. 24, 1999.

(51) Int. Cl.$^7$ ................................................ B01D 35/30
(52) U.S. Cl. .............................. 55/471; 55/496; 96/223
(58) Field of Search ......................... 55/467, 471, 473, 55/496; 96/223; D23/365

(56) References Cited

U.S. PATENT DOCUMENTS

| | | |
|---|---|---|
| 2,883,790 A | 4/1959 | Blackman |
| 4,477,272 A | 10/1984 | Hollis et al. |
| 4,750,863 A | 6/1988 | Scoggins |
| 4,781,526 A | 11/1988 | Mead |
| 4,889,543 A | 12/1989 | Burt |
| D359,800 S | 6/1995 | Cich, Jr. et al. |
| D372,079 S | 7/1996 | Fago et al. |
| 5,641,340 A | 6/1997 | Kagan |
| D408,513 S | 4/1999 | Reede |
| 5,904,744 A | 5/1999 | Kagan |
| 6,045,329 A * | 4/2000 | Sobala ................... 416/146 R |

FOREIGN PATENT DOCUMENTS

| | | |
|---|---|---|
| FR | 2299042 | 10/1976 |
| JP | 63-302234 | 12/1988 |
| JP | 9173432 A | * 7/1997 |

* cited by examiner

Primary Examiner—Robert A. Hopkins
(74) Attorney, Agent, or Firm—Richard C. Litman

(57) ABSTRACT

An air filtering device removably attaches to the back or inlet side of the wire guard of a conventional portable desktop electric fan or the like, for filtering foreign matter from the ambient air in a room in which the fan is operating. The filter device comprises a filter element and solid shroud, with the shroud capturing the filter element between the back of the fan guard and the inner surface of the shroud. The filter element has a generally toroidal, tire-like shape, with the open inner annulus area providing access to the inner volume of the filter. The shroud is shaped similarly to the filter, but has only a single wall configured to fit about the back or inlet side of the fan guard. The shroud has an outer rim including attachments for securing the shroud to the outer periphery of the fan guard, and an inner annulus having a lip extending therefrom for securing one annulus of the filter thereto. The other annulus of the filter secures tightly about the fan motor housing, thereby precluding passage of any foreign matter past the filter and through the fan. One wall or panel of the filter is thus drawn against the back of the fan guard, with the other wall remaining against the inner surface of the shroud to define a debris capture pocket between the two walls or panels of the filter element. The filter element may be formed of either disposable or washable reusable materials as desired.

20 Claims, 5 Drawing Sheets

AIR FILTERING DEVICE HAVING A TOROIDALY SHAPED SHROUD ATTACHED TO A FAN GUARD FOR HOLDING A TOROIDALLY SHAPED FILTER ELEMENT

REFERENCE TO RELATED PATENT APPLICATION

This application claims the benefit of U.S. Provisional, Patent Application Serial No. 60/155,706, filed on Sep. 24, 1999.

BACKGROUND OF THE INVENTION

1. Field of the Invention

The present invention relates generally to filtration systems and devices, and more specifically to an air filtering device which is removably attachable to a conventional portable electric fan. The present device essentially comprises a filtering element which fits against the back of the fan guard, with a generally toroidally shaped shroud attaching to the periphery of the fan guard at the rear of the fan to guide air past the motor and through the filter.

2. Description of the Related Art

In recent years, people have become more aware of various airborne impurities which are commonly found in indoor environments in the home, office, and other locations. Such impurities range from secondhand tobacco smoke to asbestos dust and other less hazardous materials. Many such hazards, such as those two noted specifically above, are considered to be sufficiently dangerous that indoor smoking has been banned in most areas of the country and considerable sums of money have been spent on asbestos cleanup.

Nonetheless, other undesirable airborne impurities in the form of dust, pollen, etc., generally circulate in most indoor environments, even with centralized filtration systems associated with conventional central heating and air conditioning systems. Accordingly, various systems and devices have been developed in the past in attempts to filter or clean the ambient air within a relatively small localized area, such as a room or individual office space. These devices and systems have generally not provided the efficiency and economy desired in such devices, for various reasons noted further below.

Accordingly, a need will be seen for a filtering device for attaching to the back of a conventional portable electric fan, for guiding air through the back of the fan and for filtering air as it passes through the fan guard to be expelled from the front of the fan. The present air filtering device generally comprises a toroidally shaped solid shroud which may be removably attached to the back of the fan guard to surround the motor. An annulus is defined between the inner edge of the shroud and the motor, to guide airflow past the motor and through the back of the fan guard. A toroidal filter secures about the motor and between the fan guard and shroud, with all air passing through the fan being required to pass through the filter. The filter may be formed of durable material for cleaning and reuse, or may be disposable, as desired.

A discussion of the related art of which the present inventor is aware, and its differences and distinctions from the present invention, is provided below.

U.S. Pat. No. 2,883,790 issued on Apr. 28, 1959 to Reed J. Blackman, titled "Fan-Type Insect Catching Device," describes an assembly comprising a screen installed at the outlet side of the fan, with an electric light bulb installed at the inlet side of the fan. The Blackman device is intended to capture insects by means of attracting insects to the light, whereupon they are drawn into the fan and captured by the screen extending from the outlet side. Blackman teaches away from the present invention, as he cannot install the capture screen on the inlet side as it would at least partially conceal the insect attracting light source which of course must be placed at the inlet side of the fan. Moreover, the screen used by Blackman is relatively coarse in comparison with the filtering material of the present invention, as even the smallest insect is many orders of magnitude larger than the particulate matter which is captured by the present filter.

U.S. Pat. No. 4,477,272 issued on Oct. 16, 1984 to Craig E. Hollis et al., titled "Fan Filter," describes a filter disc which is removably secured to the back of the fan guard of a conventional portable fan. Hollis notes the benefit of placing the filter upstream of the fan to reduce or preclude the buildup of foreign matter on the fan blades, which is a widely recognized problem. Yet, the Hollis et al. filter does not completely cover the inlet side of the fan guard, due to a slot provided in the filter to fit the device over the fan motor in back of the guard. The present filter secures completely and tightly about the fan motor, thereby directing all airflow through the filter.

U.S. Pat. No. 4,750,863 issued on Jun. 14, 1988 to Glenn Scoggins, titled "Fan Shroud Filter," describes a filter and shroud for installation with a permanently installed ceiling fan, rather than a portable desktop or similar fan as provided with the present fan filter. Scoggins places his filter above the fan, to the inlet side of the fan when the fan is blowing downwardly. As no guard means is conventionally applied to such ceiling fans, the Scoggins filter would tend to be drawn into the fan, whereas the present filter is drawn against the back of the fan guard to help hold it securely in place. Moreover, the Scoggins shroud attaches to the ceiling above the fan or to the suspension shaft of the fan, as no guard is provided for attachment of his filter device.

U.S. Pat. No. 4,781,526 issued on Nov. 1, 1988 to Clarence Mead, titled "Fan And Filter Combination," describes a filter system for installation to a conventional "box fan," having a square shroud. The Mead filter device requires modification of the fan shroud by installing guide rails along each side thereof, for sliding the rectangular filter element therein. In contrast, the present filter system does not require any modification of the fan for its placement thereon. Moreover, Mead does not provide any form of close fitting shroud about the fan itself, as provided by the present invention. The Mead filter is more like a conventional central furnace or air conditioning filter, having a rigid structure and periphery, and is not adapted for installation to a tabletop fan or the like, where the flexibility of the present filter element allows it to conform to the back of the fan guard.

U.S. Pat. No. 4,889,543 issued on Dec. 26, 1989 to Jerry D. Burt, titled "Air Filtering System," describes a rotating filter which is attached to the blades of a ceiling fan. The Burt filter is completely different from the present filtering system, in that (1) no shroud is provided, (2) the filter elements attach to the fan blades and thus rotate with the blades, rather than remaining stationary relative to the moving blades as in the present fan filter system, and (3) the filter elements do not closely envelop the fan motor in order to preclude entrainment of foreign matter through the center of the fan circulation. The Burt filter system can only be used on a relatively slowly turning, large diameter fan such as a ceiling fan, as the high speed of the typical table top fan would throw the filter elements from the blades due to centrifugal force.

U.S. Pat. No. 5,641,340 issued on Jun. 24, 1997 to Anton Kagan, titled "Method For Filtering Air In Laminar Flow,"

describes a first embodiment directed to filtering airflow through cooling fans as used in computers and the like. The only embodiment of the Kagan disclosure which is adaptable to portable fans, is shown in FIGS. 7 and 8 of the Kagan '340 U.S. Patent. In those Figures, an annular ring shaped filter is secured to the outer perimeter of the generally circular fan guard. Kagan fails to provide any form of filter for the back of the fan, where incoming air is entrained through the fan blade path by the rotating blades. The present filtration system covers this entire area, to capture dust and other foreign matter before it enters the guard and blade path.

U.S. Pat. No. 5,904,744 issued on May 18, 1999 to Anton Kagan, titled "Fan Filter With Fasterning (sic) Means," describes further variations on the filtering methods of the '340 U.S. Patent to the same inventor, discussed immediately above. The various embodiments of the '744 Kagan U.S. Patent which are directed to smaller desktop and table type fans are all of essentially the same configuration as those of the '340 U.S. Patent, i. e., the filter does not extend directly into the airflow path of the fan, either upstream or downstream of the blades. Rather, the Kagan filter is a circumferential device applied to the fan guard periphery, outside of the circular blade path. While this might reduce slightly any impurities ejected from the tips of the rotating blades, such air movement is a relatively small volume, of the total air moved by a fan or propeller, and would produce a relatively small filtering effect in comparison with the generally diametrically disposed filter of the present invention.

U.S. Pat. No. D-359,800 issued on Jun. 27, 1995 to James J. Cich, Jr. et al., titled "Air filter For Attachment To A Fan Grill," illustrates a design for a fan filter having a semicircular configuration with an apparently rigid grate thereacross. The only means of securing the device to the fan guard is by a series of clips about the inner central arcuate edge of the device, rather than being held in place by a solid guard and secured about the fan motor at the back of the fan, as in the present filter. The Cich, Jr. et al. filter covers less than half of the rotating area of the fan, unlike the present filter which covers all of the fan area.

U.S. Pat. No. D-372,079 issued on Jul. 23, 1996 to Dennis M. Fago et al., titled "Fan Filter," illustrates a design for a filter having a circular shape with a rim extending therefrom. An opening is provided in the center of the disc area, with an apparently decorative trim strip extending around the opening and radially outwardly therefrom. No means for securing the device to a fan or indication of attachment to the front or back of the guard is apparent, nor is any form of solid shroud shown. Moreover, the Fago et al. design apparently comprises only a single thickness, rather than the double thickness provided by the present filter device.

U.S. Pat. No. D-408,513 issued on Apr. 20, 1999 to Dwayne E. Reede, titled "Filter For A Round Fan," illustrates a design closely resembling that of the Fago et al. '079 U.S. Design Patent, discussed immediately above. No means of securing the device to a fan is apparent, nor is any form of separate solid shroud disclosed in the '079 Design Patent. It is also noted that as in the case of the Fago et al. '079 design, that the Reede design comprises only a single thickness of material, unlike the double layers of filter material provided by the present invention, wherein one layer is drawn against the back of the fan guard while the opposite layer remains against the inside wall of the shroud, thereby defining a debris capture pocket between the two layers of filter material.

French Patent Publication No. 2,299,042 published on Oct. 1, 1976 describes (according to the English abstract) a centrifugal fan or blower having filters disposed to each side of the plane of rotation of the fan blades. Air is drawn in through the filters on each side, and expelled generally radially between the outer edges of the filter elements by centrifugal force. The '042 French Patent Publication teaches away from the present invention, in that the shrouds or guards over the filters are required to be perforated in order to allow incoming airflow therethrough and through the filters to the centrally located centrifugal blower. The present shroud is solid and unbroken when installed on the fan, with the exception of the single passage through the center.

Finally, Japanese Patent Publication No. 3,302,234 published on Dec. 9, 1988 describes (according to the English abstract) a fan filter comprising a spiral wound corrugated belt. The filter configuration is thus somewhat similar to a conventional vehicle oil filter or the like, rather than comprising a porous woven or nonwoven material or open cell foam material, as in the case of conventional air filters. The filter of the Japanese Patent Publication is thus relatively deep and bulky, in comparison to the present filter. Moreover, no means of securing the filter to a conventional wire type fan guard is disclosed in the Japanese Patent Publication, as provided by the present filter invention.

None of the above inventions and patents, taken either singly or in combination, is seen to describe the instant invention as claimed.

SUMMARY OF THE INVENTION

The present invention is an air filter for use with a portable desktop or tabletop electric fan. The filtering device comprises a relatively thin, generally circular filter element captured between the back or inlet side of a conventional wire fan guard and a solid shroud. The filter element has a generally toroidal shape, resembling a tire, with the inner annular area being open for access to the interior of the device. A solid shroud is also provided, to capture the filter between the shroud and the back or inlet side of the conventional wire fan guard. One side of the filter is drawn against the back or inlet side of the fan guard when the fan is operating, with the opposite filter side lying adjacent to the inner surface of the shroud.

The shroud also has a generally toroidal shape when closed about the back of the fan guard, with hinge and/or clasp means for securing the two halves together about the fan guard. A series of clips are provided about the outer circumference of the shroud, for securing it to the periphery of the fan guard. The shroud includes a central opening therethrough which is larger than the motor casing of the fan, thereby defining an air inlet annulus for the fan. The outermost layer of the filter secures about a lip extending from the inner edge of the shroud, while the innermost layer of the filter secures about the fan motor housing, thereby precluding any leakage of unfiltered air past the filter. As the assembly secures only to the fan guard, it may be applied to both stationary and oscillating fans.

Accordingly, it is a principal object of the invention to provide an improved air filtering device for use with portable electric desktop and tabletop fans and the like.

It is another object of the invention to provide an improved, air filtering device, which device comprises a generally toroidally shaped filter element having first and second walls and an inner annular opening to the interior defined by the walls, and a solid shroud for capturing the filter element between the conventional rear or inlet side of the fan guard and the shroud.

It is a further object of the invention to provide an improved air filtering device wherein the filter element first wall is drawn against the rear side of the fan guard and the second wall rests against the inner surface of the shroud, with foreign matter being captured between the two walls of the filter element to clean the ambient air and reduce accumulation of foreign matter on the fan.

An additional object of the invention is to provide an improved air filtering device wherein the filter fits closely about the fan motor and secures tightly to the inner lip of the shroud, precluding passage of unfiltered air around the filter element.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
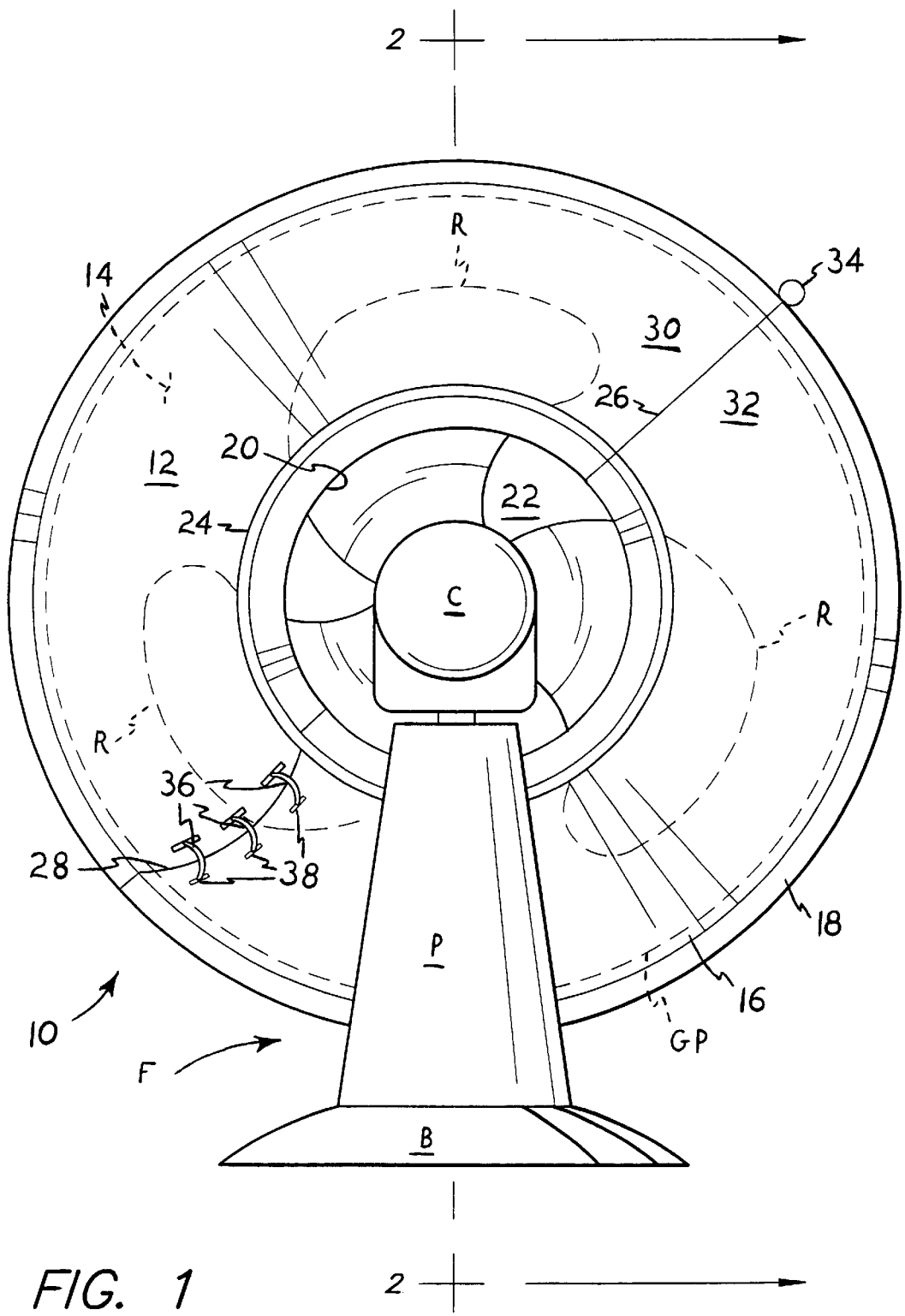
FIG. 1 is a rear elevational view of a conventional portable desktop or tabletop electric fan, showing the present air filtering device installed thereon.
Figure 2:
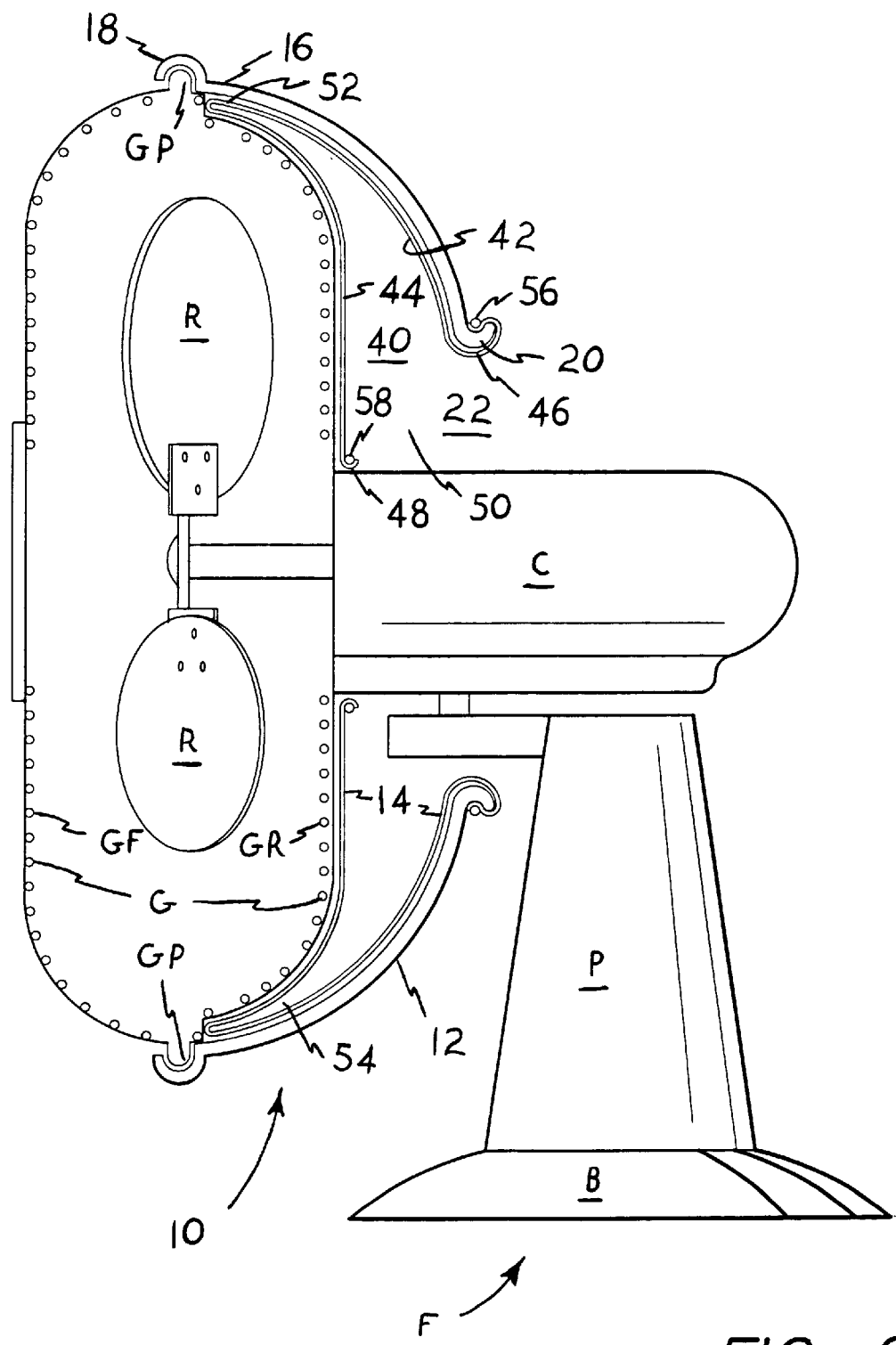
FIG. 2 is a side elevation view of the assembly of FIG. 1, with the fan guard, filter element, and shroud shown in section along line 2—2 of FIG. 1 to show further details.
Figure 5:
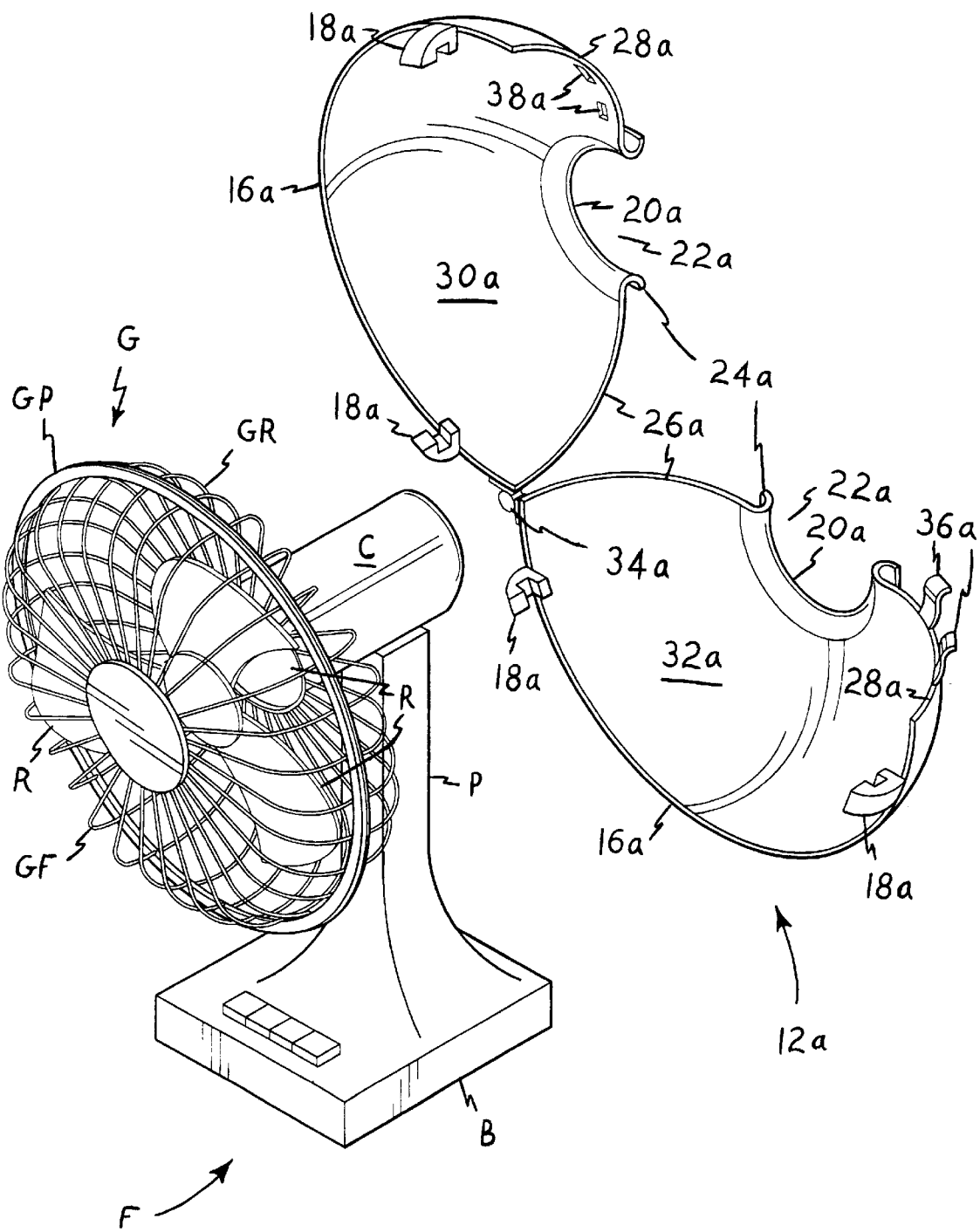
FIG. 5 is an exploded perspective view of an alternate embodiment shroud of the present invention and a fan, with the filter element not shown for clarity in the drawing Figure.

The present invention is directed to an air filtering device for removable installation to a conventional portable desktop or tabletop type electric fan. Such a fan F is illustrated in FIGS. 1, 2, and 5 of the drawings, and includes at least a base B, a pedestal P, a fan motor casing C, and a plurality of rotary fan blades R enclosed within a fan guard G, with the guard G having a front portion GF, an opposite rear portion GR, and a perimeter GP.

Figure 3:
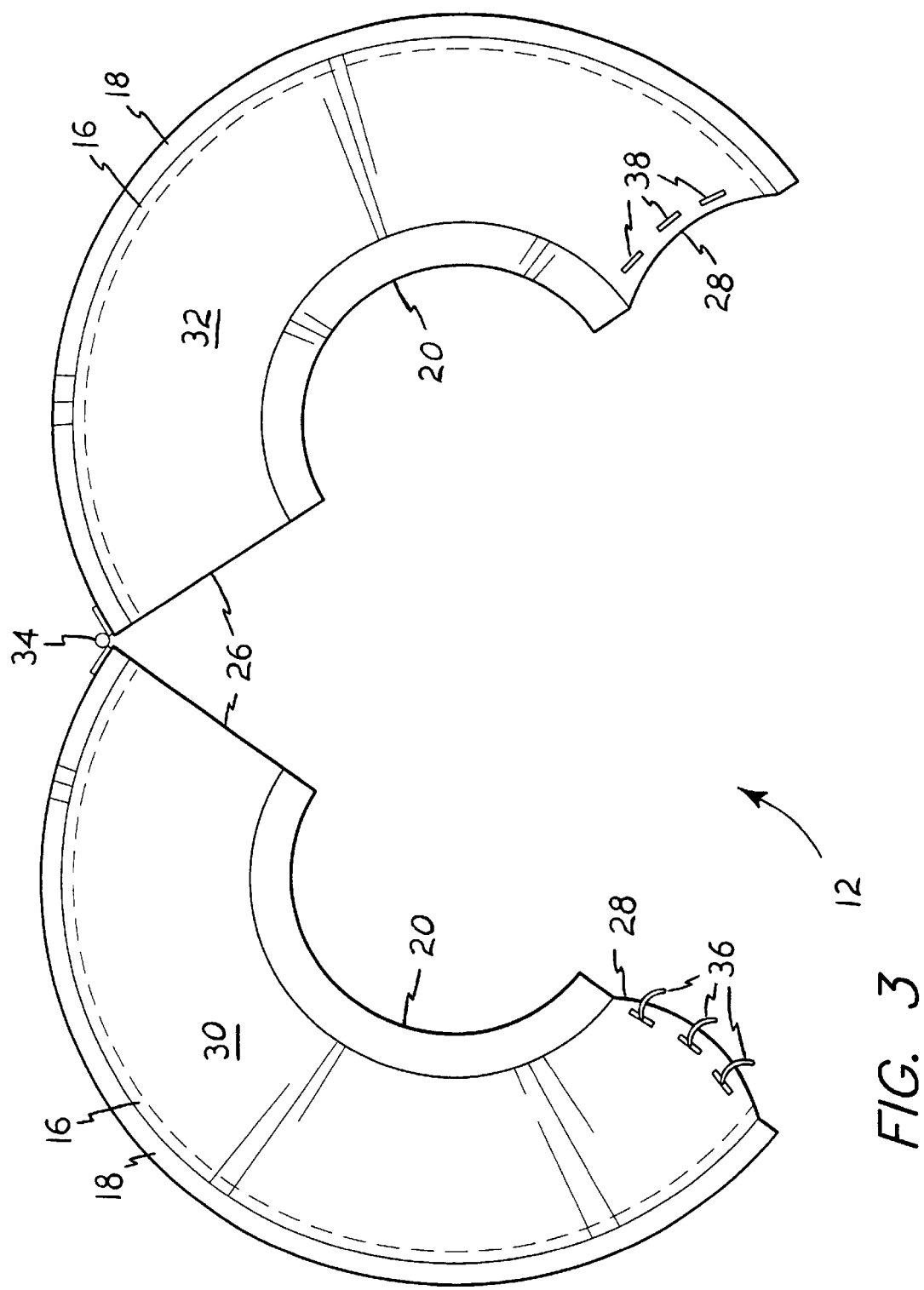
FIG. 3 is a rear elevation view of the solid shroud of the present invention, showing the means for opening the shroud for installation upon a fan guard.

The air filtering device 10 includes a solid, gas and particulate impervious shroud 12 formed of molded plastic, sheet metal, or other suitable material, which attaches to the fan guard G and captures a filter element 14 between the shroud 12 and the rear portion GR of the guard G. FIGS. 1 through 3 illustrate a first shroud embodiment, having a generally toroidal shape for generally surrounding the rear portion GR of the fan guard G. The shroud 12 has an outer periphery 16 with means for attaching the shroud 12 to the fan guard periphery GP, comprising a continuous circumferential lip 18 about the periphery 16 of the shroud 12.

The shroud 12 also defines an inner annular opening 20 around the fan motor casing C when the shroud 12 is secured to the fan guard G. The diameter of the annular opening 20 is somewhat larger than the diameter of the motor casing C, in order to provide a toroidal airflow inlet passage 22 surrounding the motor casing C within the opening 20. An outwardly turned filter attachment lip 24 extends rearwardly from the inner annular opening 20, with the lip 24 providing for the sealing of the filter element 14 thereto.

It is noted that the shroud 12 cannot be installed about the fan guard G without some means of opening the shroud 12 to fit around the back of the guard GR. The shroud 12 is thus divided generally diametrically by two opposed joints 26 and 28, which separate the shroud into semicircular first and second portions 30 and 32. The first joint 26 has a hinge 34 (or other suitable means) attaching the two shroud portions 30 and 32 together, and allowing them to be opened as needed for placement onto or removal from the fan guard G. The opposite second joint 28 includes mutually cooperative fastening means for selectively securing the two shroud components 30 and 32 together about the fan guard G. The fasteners may comprise one or more clips 36 which fit securely into a like number of cooperating slots or hooks 38, or other means (hook and loop fabric fastening material, snaps, etc.) as desired.

Figure 4:
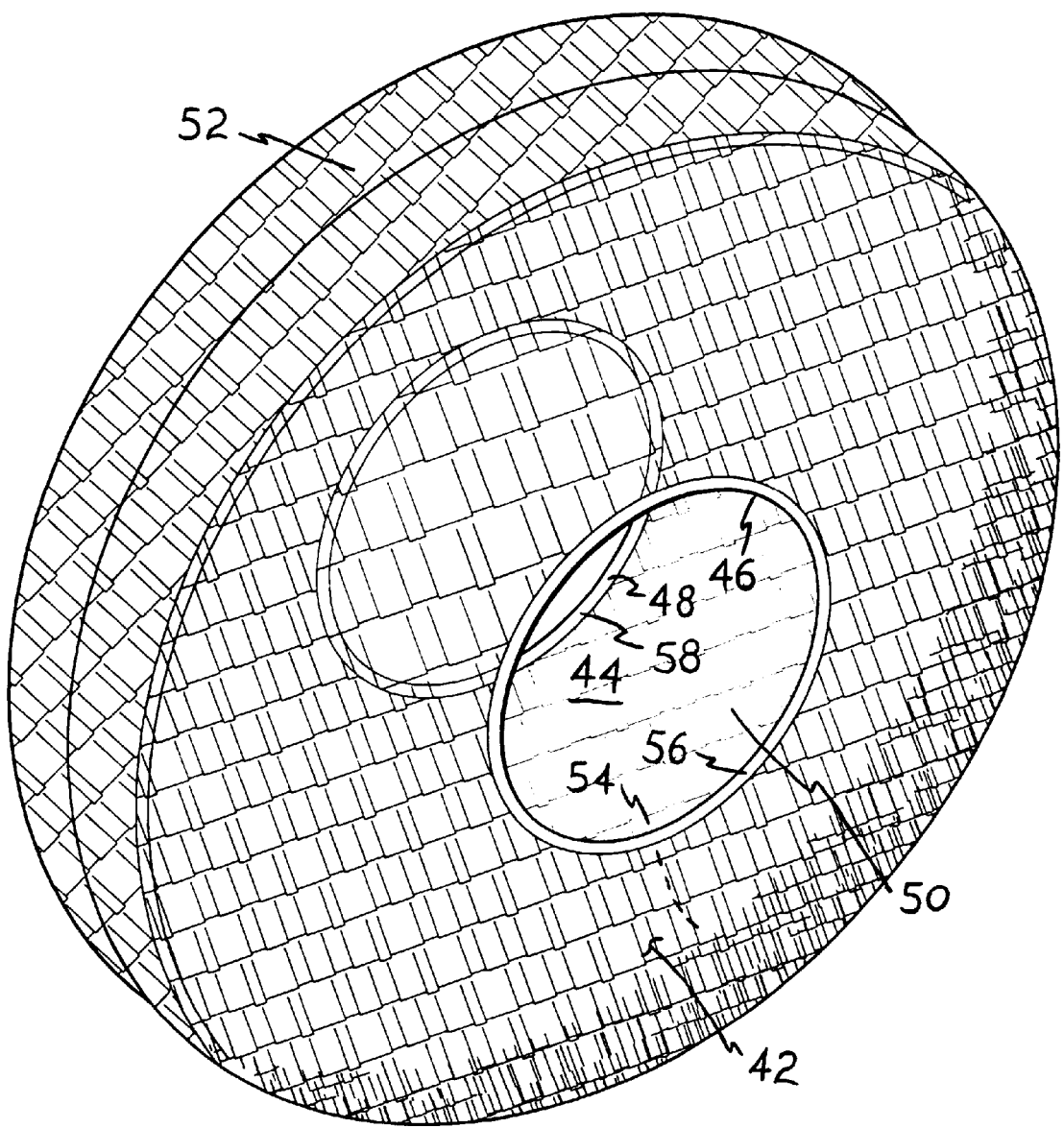
FIG. 4 is a perspective view of the filter element of the present invention, showing its general configuration.

It will be seen in FIG. 2 of the drawings, that the shroud 12 is bowed outwardly to the rear, thereby defining a filter containment area 40 between the shroud 12 and the rear side GR of the fan guard G for capturing the filter element 14 between the shroud 12 and the fan guard rear portion GR. The filter element 14 is shown in detail in FIG. 4 and comprises a generally toroidally shaped container, having a first wall 42 and opposite second wall 44. The two filter walls 42 and 44 each include a central opening therethrough, respectively comprising a first opening 46 and a second opening 48, providing an open inner annulus area 50 between the two filter walls 42 and 44. The two walls 42 and 44 are joined by an outer periphery 52, which closes the outer portion of the filter element 14 and defines a debris capture pocket 54 between the two walls 42 and 44. The present filter element 14 will thus be seen to have a shape or configuration much like an unmounted tire, with the interior being accessible through the center of the toroid shape. Debris (dust, small insects, pollen, etc.) enters the debris capture pocket 54 through the open inner annulus area 50 at the center of the filter 14, particularly through the first opening 46 of the first wall 42.

The first opening 46 of the filter element 14 includes means (e. g., elastic band 56, conventional draw string, etc.) for securing the opening 46 about the filter attachment lip 20 of the shroud 12. Any suitable attachment means may be used, so long as it provides a good seal to preclude flow of foreign matter around the outside of the filter 14. In a like manner, the second opening 48 of the filter 14 includes similar sealing and securing means, such as the elastic band 58, or a draw string, etc., for securing the second opening 48 tightly about the motor casing C of the fan F. In this manner, it will be seen that air flowing through the airflow inlet area 22 of the shroud 12 passes through the first opening 46 of the filter 14, due to that opening being wrapped about the lip 20 of the shroud 12. However, airflow must then pass through the second wall 44 of the filter 14, as the second opening 48 is sealed about the motor casing C of the fan F.

The filter 14 may be formed of any suitable material which allows air to pass therethrough while precluding passage of particulates such as dust, pollen, etc. Open cell synthetic foam materials may be used, for example. Woven and nonwoven fiber materials also work well in such applications. In many instances, it may be desirable to form the present filter 14 of economically disposable materials (e. g., paper, etc.) in order to preclude the necessity of periodic cleaning. Alternatively, more durable filter materials may be cleaned periodically for reuse. The present filter 14 may also be treated with an antiallergenic substance, if so desired, as is known in various unrelated air filtration systems.

The present air filter device 10 is installed on a fan F by first stretching the elastic band 58 (or other sealing means) of the first opening 48 of the filter 14, about the motor casing C of the fan F. The flexible material of the filter element 14 is then spread over the fan guard rear portion GR. The shroud 12 is opened (if necessary), placed about the guard rear area GR of the fan F, and closed by securing the latch means 36, 38 (or other closure means) to secure the shroud 12 about the fan guard rear portion GR with the lip 18 of the shroud 12 secured over the fan guard periphery GP. Finally, the elastic band 56 (or other sealing means) of the first filter opening 46 is secured tightly about the motor casing C of the fan F, to complete the installation.

When the fan F is operated, airflow through the airflow inlet area 22 and first opening 46 of the filter 14 defined by the annular shroud opening 20 and motor case C of the fan F, enters the filter containment area 40 between the rear of the fan guard GR and the fan shroud 12. The fan blades R draw the flexible first wall 42 of the filter 14 against the grid of the rear of the fan guard GR, while the second wall 44 of the filter 14 is captured against the inner surface of the impervious fan shroud 12. The debris capture pocket 54 defined between the two filter walls 42 and 44, provides for the capture of dust, pollen, small insects, and other undesirable airborne elements and contaminants as the fan F operates in the manner described above.

As noted further above, the present filter element 14 may be formed of economically disposable materials. Such a disposable filter 14 may be removed from the fan F and shroud 12 essentially by reversing the installation steps described further above, with all foreign matter trapped by the filter 14 remaining within the debris capture pocket area 54 of the filter 14. Thus, the exterior surface of the filter 14 remains relatively clean for handling and disposal, with little if any dust, etc. escaping from the filter 14 as it is removed from the fan F and disposed of. Where the filter 14 of the present invention is formed of reusable material(s), the filter may be cleaned easily by everting the filter 14 to place the surfaces defining the debris capture pocket 54 to the outside of the filter 14. The filter 14 may then be shaken or brushed out, washed, etc., as appropriate for the material(s) from which the filter 14 is formed. A zipper or other closure means (not shown) may be provided if desired for ease of opening the reusable filter.

FIG. 5 of the drawings illustrates an alternative embodiment of a shroud 12a, with corresponding components to the shroud 12 of FIGS. 1 through 3 being designated by corresponding reference characters with the subscript "a," i. e., 16a through 38a. However, it will be noted that the fan shroud 12a of FIG. 5, does not have a complete fan guard attachment lip extending continuously therearound, as does the fan shroud 12 of FIGS. 1 through 3. Rather, the fan shroud 12a of FIG. 5 includes a series of separate clips 18a extending from the outer periphery 16a, which may clip removably to the fan guard perimeter GP.

In summary, the present air filtering device provides an economical and convenient means for filtering the ambient air within a home, office, or other enclosed area, using a simple portable electric desktop fan or the like. While emphasis has been placed upon the use of the present filtering device with such a desktop fan, it will be seen that it is readily adaptable to virtually any type of heating or cooling fan having a generally circular guard extending therearound, and in fact the shroud of the present device may be configured to fit noncircular guards as well. The fact that the shroud attaches directly to the fan guard and the second opening of the filter attaches directly to the motor casing of the fan, permits the present filtering device to be applied to both stationary type fans and oscillating type fans, where the motor and fan oscillate laterally together to distribute airflow throughout an area. The relatively light weight of the shroud and filter assembly do not appreciably affect the balance of oscillating or stationary fans, and do not inhibit their operation.

It should be noted that the present disclosure makes no distinction regarding the provision of the present invention as an aftermarket device to be installed upon an existing conventional fan, or to the provision of the device with a fan at the time of manufacture of the fan. The present air filtering device may be easily incorporated with fans at the point of manufacture, with the filter shroud being formed as a part of the fan guard at that time.

The shroud of the present invention may be formed in virtually any color desired, or may be made to be translucent or transparent, if so desired, in order to blend with the decor of any area in which a fan using the present invention may be placed. The present filtering device requires no extra energy for operation, with the economy of the initial purchase, operation, and maintenance of the device, providing a much needed means for economically eliminating various impurities from the indoor environment.

It is to be understood that the present invention is not limited to the embodiments described above, but encompasses any and all embodiments within the scope of the following claims.

I claim:

1. An air filtering device for removably attaching to a portable electric fan, with the fan including at least a motor casing and a fan guard with a rear portion, a front portion, and a perimeter, said air filtering device comprising:

a generally toroidally shaped filter element having a first wall and a second wall opposite said first wall, for removably installing adjacent the rear portion of the fan guard of the fan;

said first wall and said second wall respectively having a first opening and a second opening formed centrally therethrough;

said first opening and said second opening defining an open inner annulus area between said first wall and said second wall;

said filter element further having an outer periphery joining said first wall and said second wall to define a debris capture pocket therebetween, with said debris capture pocket being accessible by means of said open inner annulus area;

said first opening of said filter element including means for removably and sealingly attaching to a shroud;

said second opening of said filter element including means for removably and sealingly attaching about the motor casing of the fan; and a generally toroidally shaped shroud formed of a particulate impervious material, for removably installing to the perimeter of the fan guard of the fan, said filter element being captured between said shroud and the rear portion of the fan guard of the fan;

said shroud having an outer periphery and an inner annular opening;

said outer periphery of said shroud including fan guard attachment means extending therefrom;

said inner annular opening of said shroud being configured to define a generally toroidally shaped air passage between said inner annular opening of said shroud and the motor casing of the fan; and said inner annular opening of said shroud further including means for removably and sealingly attaching said first opening of said filter element thereto.

2. The air filtering device according to claim 1, wherein:

said shroud comprises a first portion and a second portion; and said shroud has a first joint and a second joint generally diametrically opposite said first joint, said first joint including hinge means connecting said first portion and said second portion of said shroud and said second joint including separable fastening means for removably securing said first portion and said second portion of said shroud together at said second joint thereof.

3. The air filtering device according to claim 1, wherein said filter element is formed of filtration materials selected from the group consisting of open cell foam, woven fiber, nonwoven fiber, disposable, and reusable materials.

4. The air filtering device according to claim 1, wherein:

said means for removably and sealingly attaching said first opening of said filter element to said inner annular opening of said shroud comprises an outwardly turned lip extending from said inner annular opening of said shroud; and said first opening of said filter element includes shroud lip attachment means selected from the group consisting of an elastic band and a draw string.

5. The air filtering device according to claim 1, wherein:

said means for removably and sealingly attaching said second opening of said filter element to the motor casing of the fan is disposed about said second opening of said filter element for removably securing about the motor casing of the fan; and said means for removably and sealingly attaching said second opening of said filter element to the motor casing of the fan is selected from the group consisting of an elastic band and a draw string.

6. The air filtering device according to claim 1, wherein said filter element includes means for removing allergenic particles from the airflow, said means impregnated within the filter element.

7. The air filtering device according to claim 1, wherein said fan guard attachment means of said outer periphery of said shroud is selected from the group consisting of a single continuous peripheral flange and a plurality of separate clips for removably securing to the perimeter of the fan guard.

8. The air filtering device according to claim 1, wherein said shroud is formed of a solid, gas impermeable sheet of material.

9. The air filtering device according to claim 8, wherein said shroud is formed of materials selected from the group consisting of plastic and metal.

10. The air filtering device according to claim 1, wherein said shroud is selectively colored for matching ambient decor as desired.

11. A portable electric fan and an air filtering device removably attachable thereto, comprising in combination:

a fan including at least a motor casing and a fan guard with a rear portion, a front portion, and a perimeter;

an air filtering device including a generally toroidally shaped filter element having a first wall and a second wall opposite said first wall removably installed adjacent said rear portion of said fan guard of said fan;

said first wall and said second wall of said filter element respectively having a first opening and a second opening formed centrally therethrough;

said first opening and said second opening of said filter element defining an open inner annulus area between said first wall and said second wall;

said filter element further having an outer periphery joining said first wall and said second wall to define a debris capture pocket therebetween, with said debris capture pocket being accessible by means of said open inner annulus area;

said first opening of said filter element including means for removably and sealingly attaching to a shroud;

said second opening of said filter element including means for removably and sealingly attaching about said motor casing of said fan;

said air filtering device further including a generally toroidally shaped shroud formed of a particulate impervious material, the shroud being removably installed to said perimeter of said fan guard of said fan and capturing said filter element between said shroud and said rear portion of said fan guard of said fan;

said shroud having an outer periphery and an inner annular opening;

said outer periphery of said shroud including fan guard attachment means extending therefrom;

said inner annular opening of said shroud being configured to define a generally toroidally shaped air passage between said inner annular opening of said shroud and said motor casing of said fan; and said inner annular opening of said shroud further including means for removably and sealingly attaching said first opening of said filter element thereto.

12. The fan and air filtering device combination according to claim 11, wherein:

said shroud of said air filtering device comprises a first portion and a second portion;

said shroud has a first joint and a second joint generally diametrically opposite said first joint;

said first joint includes hinge means connecting said first portion and said second portion of said shroud; and said second joint includes separable fastening means for removably securing said first portion and said second portion of said shroud together at said second joint thereof.

13. The fan and air filtering device combination according to claim 11, wherein said filter element of said air filtering device is formed of filtration materials selected from the group consisting of open cell foam, woven fiber, nonwoven fiber, disposable, and reusable materials.

14. The fan and air filtering device combination according to claim 11, wherein:

said means for removably and sealingly attaching said first opening of said filter element to said inner annular opening of said shroud of said air filtering device comprises an outwardly turned lip extending from said inner annular opening of said shroud; and said first opening of said filter element includes shroud lip attachment means selected from the group consisting of an elastic band and a draw string.

15. The fan and air filtering device combination according to claim 11, wherein:

said means for removably and sealingly attaching said second opening of said filter element of said air filtering device to said motor casing of said fan is disposed about said second opening of said filter element for removably securing about said motor casing of said fan; and said means for removably and sealingly attaching said second opening of said filter element to said motor casing of said fan is selected from the group consisting of an elastic band and a draw string.

16. The fan and air filtering device combination according to claim 11, wherein said filter element of said air filtering device includes means for removing allergenic particles from the airflow, said means impregnated within the filter element.

17. The fan and air filtering device combination according to claim 11, wherein said fan guard attachment means of said outer periphery of said shroud of said air filtering device is selected from the group consisting of a single continuous peripheral flange and a plurality of separate clips for removably securing to the perimeter of the fan guard.

18. The fan and air filtering device combination according to claim 11, wherein said shroud of said air filtering device is formed of a solid, gas impermeable sheet of material.

19. The fan and air filtering device combination according to claim 18, wherein said shroud of said air filtering device is formed of materials selected from the group consisting of plastic and metal.

20. The fan and air filtering device combination according to claim 11, wherein said shroud of said air filtering device is selectively colored for matching ambient decor as desired.

* * * * *